UNITED STATES PATENT OFFICE.

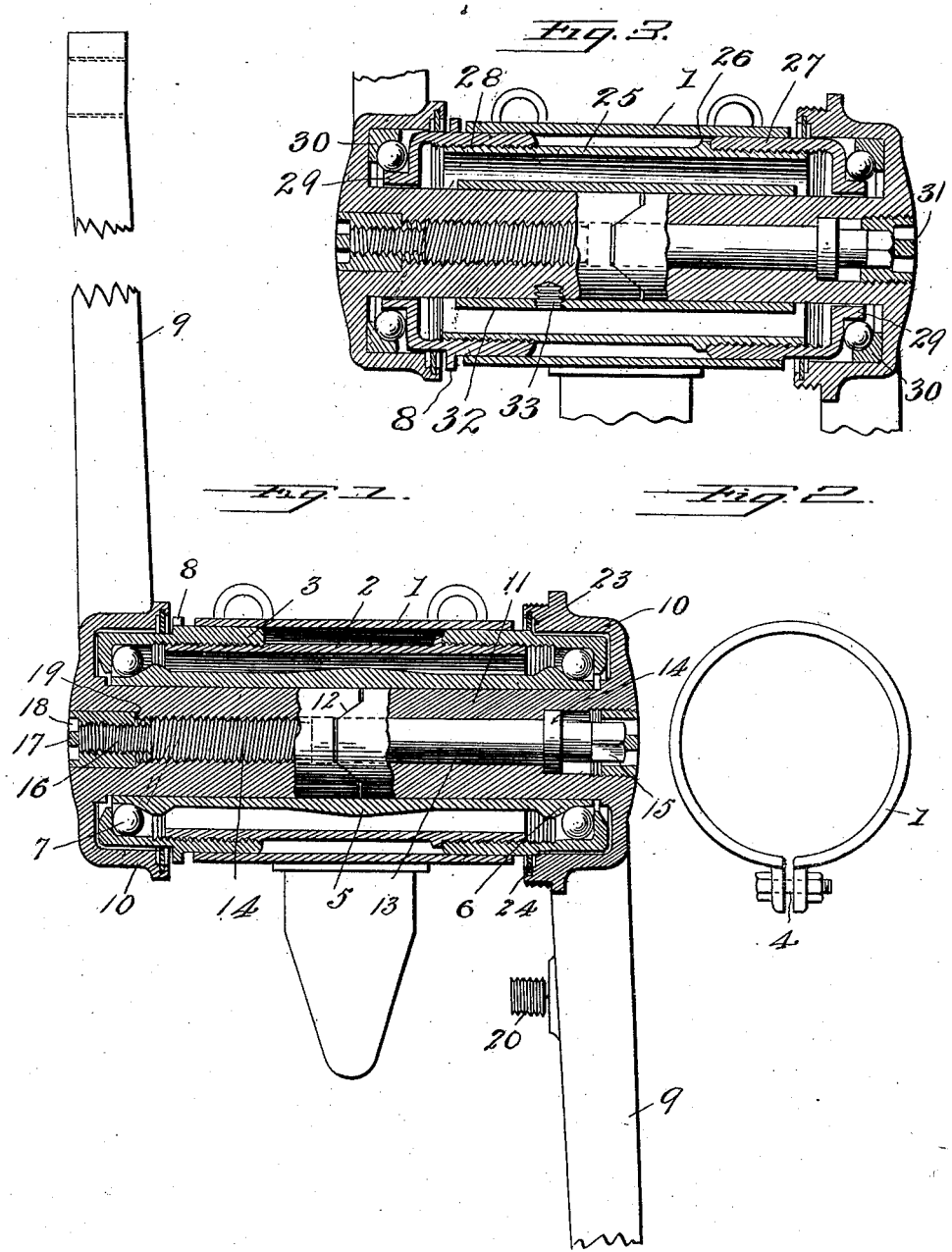

MURRAY SCHENCK, OF MIDDLETOWN, OHIO, ASSIGNOR TO THE MIAMI CYCLE & MANUFACTURING COMPANY, OF MIDDLETOWN, OHIO.

CRANK-HANGER.

986,596.   Specification of Letters Patent.   Patented Mar. 14, 1911.

Application filed May 5, 1906. Serial No. 315,433.

*To all whom it may concern:*

Be it known that I, MURRAY SCHENCK, a citizen of the United States, and resident of Middletown, in the State of Ohio, have invented certain new and useful Improvements in Crank-Hangers, of which the following is a specification.

My invention relates, primarily, to mechanisms employed principally in bicycles, and termed "crank hangers," although it may be applicable to some other uses.

It has for a principal object the assembly of such mechanism in a single compact unit in the frame of the machine, such that when desired the hanger mechanism may be entirely removed from the frame without disturbing the adjustment of the bearings.

Other objects are to facilitate the adjustment of the bearings in certain forms of the invention, to permit removal of the cranks and other parts without disturbing the bearings or their adjustment, and to generally perfect the mechanical construction of the hanger.

The advantages and characteristics of my invention are hereafter more fully described in connection with the accompanying drawing, which illustrates exemplifying forms of the invention.

Figure 1 is a longitudinal section through a hanger embodying my invention; Fig. 2, an end view of Fig. 1; Fig. 3, a section similar to Fig. 1 of a modified form of my invention.

Referring first to Fig. 1, reference numeral 1 designates a short tube which is a part of the frame, and which contains the crank hanger mechanism proper. 2, a sleeve within tube 1, which supports the bearing cups 3; these cups are interiorly threaded and screwed upon corresponding threads formed on the sleeve 2. The tube 1 is longitudinally split and provided with one or more bolts and nuts 4 by which the tube may be contracted upon the outer surfaces of the cups 3 which are thereby held correctly in position in the frame and also prevented from rotation. The bearing when once adjusted is thereby held securely in adjustment. 5 is a cone sleeve bearing at each end a cone 6 which forms the other bearing member for the adjacent cup. 7 are balls running in the races between the cones 6 and cups 3. In order to facilitate the adjustment of the bearing when the hanger proper is assembled in the frame, I provide a serrated, milled or other suitable ring 8 on one of the cups 3, and allow sufficient clearance between the tube 1 and the adjacent crank to permit this serrated ring 8 to be operated upon by any suitable tool or the fingers of the operator, so as to rotate the cup and thereby through the screw-threads formed in it, to vary its position on the sleeve 2 and alter the adjustment of the bearing in a manner which is obvious. After the adjustment is effected the tube 1 is tightened upon the outer surfaces of the cup as has been described, and the adjustment is thereby retained. The adjustment, it will be noticed, can be made without disturbing any of the other parts of the mechanism.

The mechanism so far described constitutes a complete bearing, and is itself a unit.

The cranks are constructed and secured in the hanger as follows: 9 are two cranks, each consisting of a crank arm, a hub 10, which is recessed to accommodate the ball-bearing at each end of the hanger, and a sleeve 11. These sleeves extend inwardly and are conveniently a close fit in the cone sleeve 5. The inner ends of these crank sleeves 11 are arranged to interlock by means of jaw-clutch members 12, which are conveniently, as shown in the drawing, of tapered shape, so as to insure a close fit. It is evident that the crank sleeves may be inserted within the cone sleeve after the bearing parts have been assembled. In order to retain the cranks in position a bolt 13 is provided. This has a shoulder 14 at one end, engaging a recess in the crank sleeve 11, and from a point somewhat beyond the juncture of the crank sleeves is provided with a screw-thread 14, engaging an interior thread in the other crank sleeve. The bolt is inserted freely through the crank sleeve 11 and by means of a nut 15 or similar device is screwed into the other crank sleeve, the final tightening of the bolt drawing the crank parts firmly together. The left end of the bolt is of a reduced diameter and provided with another screw-thread 16, conveniently of opposite direction to the thread 14, and a cap 17 is provided, fitting within the end of the corresponding crank sleeve and engaging by means of an interior thread the thread 16, thereby locking the bolt. It will be noted that the cap 17 is provided with recesses 18 or other suitable devices to permit it to be turned by a suitable tool, and that when in position, as shown in the drawing, its inner end engages a shoulder 19 in the crank sleeve 11 which serves as an abutment for the cap. The right hand crank 9 is provided with a stud 20 or other means for securing to it a driving sprocket, and pedals,—not shown—are to be secured to the ends of the crank for the application of power in a manner which is well known. It will be noted that the power is applied to the cranks practically in the same plane which passes through the bearings in each end of the hanger, and the operating strains are therefore correctly borne by the mechanism. The draft of the sprocket in transmitting power also comes at a point well within the planes of the bearings, and no leverage is therefore exerted upon them. To insure against the entry of dirt into the bearings the crank hubs may be provided with recesses 23 in which are fitted felt or other suitable washers 24 which touch the cups 3.

By reason of the construction above described, if it is desired to remove the cranks this may be accomplished by removing the cap 17, rotating the bolt 15, until its screw-thread is disengaged from the left hand crank sleeve, and the cranks may then be pulled out from the cone sleeve 5 and may be replaced by reverse operations without in any way disturbing the adjustment of the bearings.

In Fig. 3 is illustrated a modification in which the tube 1 serves the same purpose as in Fig. 1. 25 is a distance sleeve screw-threaded at each end and provided at one end with a shoulder 26. 27 is a right hand, and 28 a left hand, cone member, each of these having an interior screw-thread engaging threads on the sleeve 25. The ends of the members 27—28 are inwardly-turned and formed into cone bearing members 29 in the present exemplification having a two-point contact for the balls, but any suitable form of cone may, of course, be employed. 30 are the bearing cups placed loosely or suitably secured in the hubs of the cranks, which are formed similarly to those before described, and provided with dirt-excluding washers in a similar manner. The crank sleeves are similarly constructed and provided with jaw connections similar to those described, and they are secured together by a bolt and locking nut in a similar manner. It will be noted that the bolt at the nut end may conveniently be covered by a cap 31 screwed into the hub of the adjacent crank. In this figure the cone sleeve is absent. Surrounding the crank sleeves, however, is a sleeve 32 which is conveniently secured to one of the crank sleeves by a pin or stud screw 33. The other crank sleeve is inserted within the sleeve 32, and this sleeve serves to hold the crank parts in correct relation. The adjustment of the bearings in this figure is effected by a milled annulus or other device, similar to that before described, on one of the cone members 28. The bolts in the tube 1 are loosened and the member 28 may then be rotated to vary the adjustment of the bearings, and afterward locked by retightening of the bolts 4.

The manner of assembling and disassembling the bearings, and the manner in which the crank hanger supports the working strains should be obvious from the foregoing description and from that of Fig. 1.

Many changes in construction may be made within the spirit of my invention.

What I claim is:

1. In a crank hanger, the combination with a bearing unit comprising two ball-bearings and cranks extending substantially in the plane of the bearings, of means for adjusting said bearings from the exterior of the crank hanger without disturbing other parts of the mechanism.

2. In a bicycle crank hanger, the combination of a split tube forming a frame member and means for contracting the tube, a spacing sleeve therein, two similar bearing members secured to the sleeve, one of them adjustably, cranks one at each end of the hanger, connections for the cranks, a bearing member carried within the recessed hub of each crank, and balls running between the corresponding pairs of the bearing members first and last mentioned one of the bearing members first-mentioned having a portion between the split tube and the crank whereby the bearings may be adjusted without disturbing the other parts.

3. In a bicycle crank hanger, the combination of a split tube forming a frame member and means for contracting the tube, a spacing sleeve therein, two similar bearing members secured to the sleeve between it and the tube, one of them adjustably, cranks one at each end of the hanger, connections for the cranks, a bearing member carried within the recessed hub of each crank, and balls running between the corresponding pairs of the bearing members first and last mentioned one of the bearing members first-mentioned having a portion between the split tube and the crank whereby the bearings may be adjusted without disturbing the other parts.

4. In a crank hanger, the combination of a split tube forming a frame member and means for contracting the tube, a spacing sleeve, two bearing members extending beyond the tube and sleeve and having tubular parts screwed upon the sleeve between it and the tube, two cranks, one on each side of the hanger, each having a shaft, the shafts being provided with complemental clutch faces on their adjoining ends, a sleeve surrounding the shafts, a bolt passing through the shafts and connecting them, and bearing members carried in recesses in the crank hubs, which recesses also accommodate the other bearing members mentioned, and balls running between the pairs of bearing members.

In testimony whereof I have affixed my signature in the presence of two witnesses.

MURRAY SCHENCK.

Witnesses:
WM. LAW,
ALBERT DELL.

Copies of this patent may be obtained for five cents each, by addressing the "Commissioner of Patents, Washington, D. C."